J. K. Lockwood,
Saw.
N° 70,728. Patented Nov. 12, 1867.
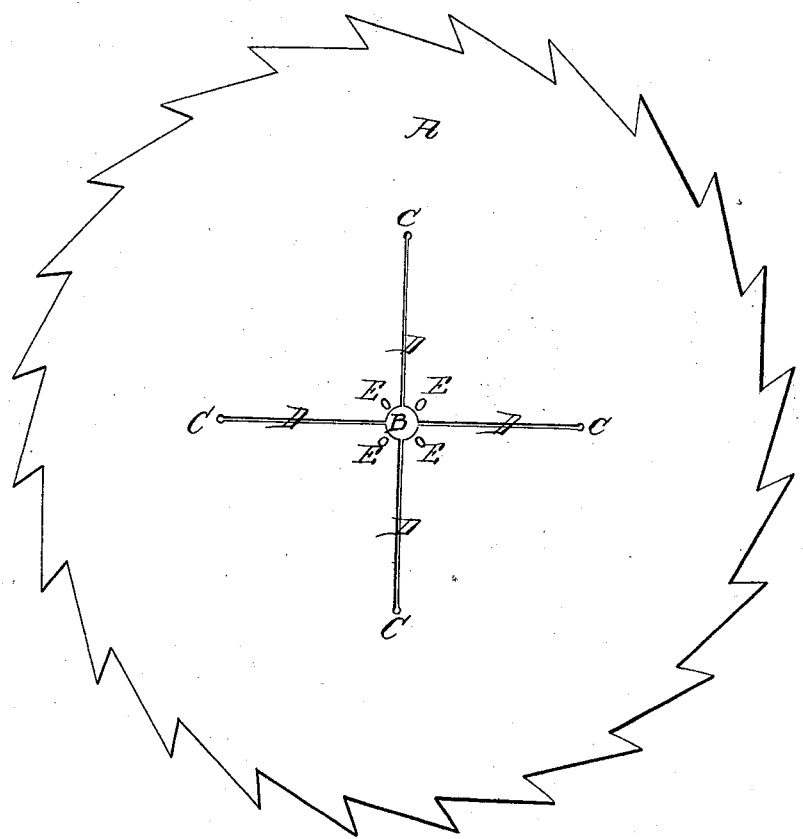
Witnesses.
H. S. Sprague
Geo Ruhlandt
Inventor.
Jas. K. Lockwood
his atty
Thos. S. Sprague

UNITED STATES PATENT OFFICE.

JAMES K. LOCKWOOD, OF ALPENA, MICHIGAN.

IMPROVEMENT IN SAWS.

Specification forming part of Letters Patent No. 70,728, dated November 12, 1867.

*To whom it may concern:*

Be it known that I, JAMES K. LOCKWOOD, of the village of Alpena, county of Alpena, and State of Michigan, have invented a new and useful Improvement in Circular Saws; and I do declare that the following is an accurate description thereof, reference being had to the accompanying drawings, and to the letters of reference marked thereon, and making part of this specification.

In making a circular saw, A, provided with the eye B, I drill or punch circular holes C C C C at any given distance between the eye B and the rim or outer edge of the saw. From these holes C C C C to the eye B, I cut slots D D D D, varying in width according to the sizes or uses of the saw. At E E E E, I cut slotted holes to receive dowel-pins, which pass from the permanent collar on the mandrel through the saw into the loose collar on the outside of the saw. These are slotted holes, instead of circular ones, to allow for the expansion and contraction of the saw. I make the eye B a little larger than the mandrel upon which it is intended to run, to still further allow for the contraction and expansion of the saw.

A saw built in the way I have described will never become wavy in its motion, as, in heating and cooling, the expansion and contraction will be taken up and neutralized by the slots D D D D and the slotted holes E E E E, and the small space allowed at the eye B, being a little larger than the mandrel upon which the saw is hung, will entirely take up or neutralize the contraction or expansion of the saw.

What I claim as my invention, and desire to secure by Letters Patent, is—

A circular saw, constructed with more or less slots D upon radial lines from the eye toward the periphery, and terminating in holes C, in combination with the oblong holes or slots E, for the purposes substantially as set forth.

JAS. K. LOCKWOOD.

Witnesses:
H. G. HANNAMAN,
H. F. EBERTS.